Jan. 29, 1924.

C. H. HAESELER 1,481,865

ROTARY ENGINE

Filed June 25, 1919 9 Sheets-Sheet 3

Fig. 3.
ON LINE 3-3.
FIG. 2.

INVENTOR
Charles H. Haeseler.
BY
Wiederheim Fairbanks.
ATTORNEYS.

Jan. 29, 1924.

C. H. HAESELER 1,481,865

ROTARY ENGINE

Filed June 25, 1919   9 Sheets-Sheet 4

Fig. 4.
ON LINE 4-4.
FIG. 3.

INVENTOR
Charles H. Haeseler.
BY
Niedersheim Fairbanks
ATTORNEYS.

Jan. 29, 1924.   1,481,865

C. H. HAESELER

ROTARY ENGINE

Filed June 25, 1919   9 Sheets-Sheet 5

INVENTOR
Charles H. Haeseler,
BY
Nidersheim Fairbanks
ATTORNEYS.

Patented Jan. 29, 1924.

1,481,865

UNITED STATES PATENT OFFICE.

CHARLES H. HAESELER, OF PHILADELPHIA, PENNSYLVANIA.

ROTARY ENGINE.

Application filed June 25, 1919. Serial No. 306,533.

*To all whom it may concern:*

Be it known that I, CHARLES H. HAESELER, a citizen of the United States, residing in the city and county of Philadelphia, State of Pennsylvania, have invented a new and useful Rotary Engine, of which the following is a specification.

My present invention in its broad and generic scope comprehends a novel construction of a rotary engine wherein automatically actuated valves, independent of the main throttle valve, are employed to control the admission of motive fluid to the pistons, and wherein novel means controlled by the piston are effective to cut off the admission of live motive fluid to the pistons at a predetermined time during their revolution or stroke.

It further comprehends a novel construction of casing, a novel construction and arrangement of automatic valve mechanism, a novel assemblage of rotors, and a novel manner of operatively connecting them with the element to be driven.

It further comprehends a novel construction and arrangement of a rotary drill adapted to be manually held by the user, and constructed in such a manner that at all times when in operation at least three of the rotary pistons are effective to revolve the drill spindle.

It further comprehends a novel rotary drill in which a plurality of sets of rotary pistons are operatively connected to a common drill spindle, and wherein provision is made for cutting off the supply of motive fluid to each piston at a predetermined time in the stroke of such piston in order to effect a very large saving in the consumption of motive fluid.

The invention further comprehends numerous novel features of construction and advantage, all of which will be hereinafter more fully set forth in the detailed description of the invention.

For the purpose of illustrating my invention, I have shown in the accompanying drawings a typical embodiment of it which is at present preferred by me, since this embodiment will give in practice satisfactory and reliable results, although it is to be understood that the various instrumentalities of which my invention consists can be variously arranged and organized and that the invention is not limited to the precise arrangement and organization of these instrumentalities as herein shown and described.

Figures 7 to 14 inclusive represent diagrammatical views showing more particularly the different positions certain of the parts assume at different stages of the operation.

Similar numerals of reference indicate corresponding parts.

Referring to the drawings.

My present invention in its broad and generic scope relates to a rotary engine which is provided with multiple power engine cylinders and in the specific application of the invention, I have preferred to illustrate it in the form of a rotary drill adapted to employ any desired type of motive fluid such as, for example, compressed air.

1 designates a rotary engine embodying my invention, which is provided with a body portion or casing 2, to which is connected by means of fastening devices 3 a gear case 4. The body portion 2 is bored to form sets of power cylinders 5, 6, 7 and 8, respectively, and in the broad scope of my invention any desired number of sets of pistons may be employed. The power cylinder 5 has its outer end closed by means of a cylinder head 9 which is secured in position by means of fastening devices 10. The power cylinder 6 has one end closed by means of a cylinder head 11 which is secured in position by means of fastening devices 12. The power cylinder 7 has one end of the cylinder closed by means of a cylinder head 13 which is secured in position by means of fastening devices 14. In a similar manner the power cylinder 8 is provided with a cylinder head 15 which is secured in assembled position by means of fastening devices 16. The power cylinders 5, 6, 7 and 8 are provided with rotary pistons 17, 18, 19 and 20, respectively, and since each of these pistons is constructed in a similar manner, a detailed description of one will suffice for all.

It is, however, to be understood that I do not confine myself to any special type or construction of rotary pistons, the ones shown herein being for the purpose of illustration, only, and any desired or conventional type of rotary piston adapted to perform the work intended can be employed. Each rotary piston consists of two identical halves 21 and 22, being duplicates and interchangeable, which are freely rotatable on an antifriction device 23 such as, for example, any desired type of ball or roller race, which in turn is freely rotatable on an eccentric 24 fixed to a shaft such as, for example, the shafts 25 and 26. As illustrated, the eccentrics are secured to the shafts by means of pins 27. The sections 21 and 22 of each rotary piston are adapted to be filled with any desired kind of lubricant, and in order that the side faces of the piston will be properly lubricated, I employ one or more ports 28 through which the lubricant may pass to lubricate the side faces of the piston and the inside faces or walls of the power cylinders with which the piston contacts.

Figures 3, 4:
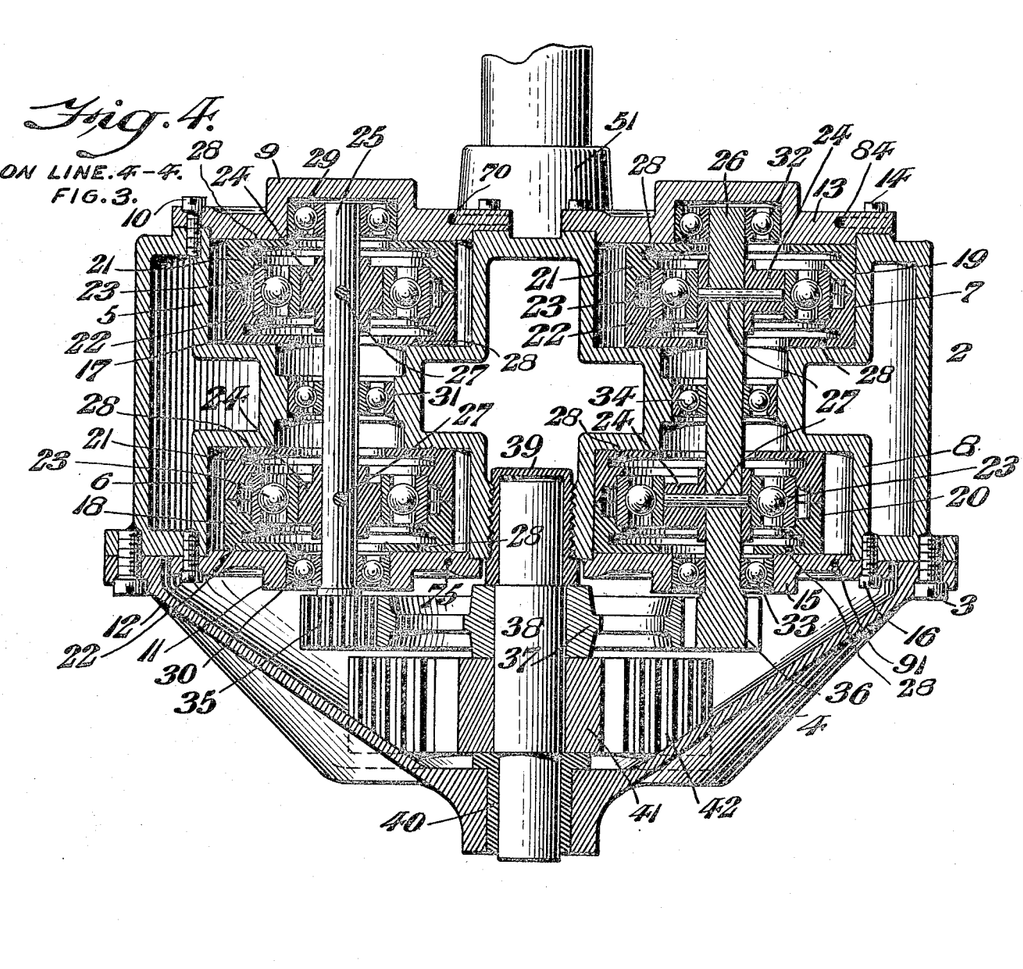
Figure 4 represents a section on line 4—4 of Figure 3.

The shaft 25 is journalled on end ball bearings 29 and 30, and an intermediate ball bearing 31, preferably located midway of the shaft and carried by the body portion 2, while the other two end bearings are mounted in the juxtaposed cylinder heads. The shaft 26 has its ends mounted in a similar manner on ball bearings 32 and 33 and on an intermediate ball bearing 34, see more particularly Figure 4. The shaft 25 is provided with a pinion 35, and the shaft 26 is provided with a similar pinion 36. These pinions are preferably formed integral with the shaft and mesh with a gear 37, keyed to a shaft 38 journalled in bushings 39 and 40, respectively, see more particularly Figures 2 and 4.

Figure 1:
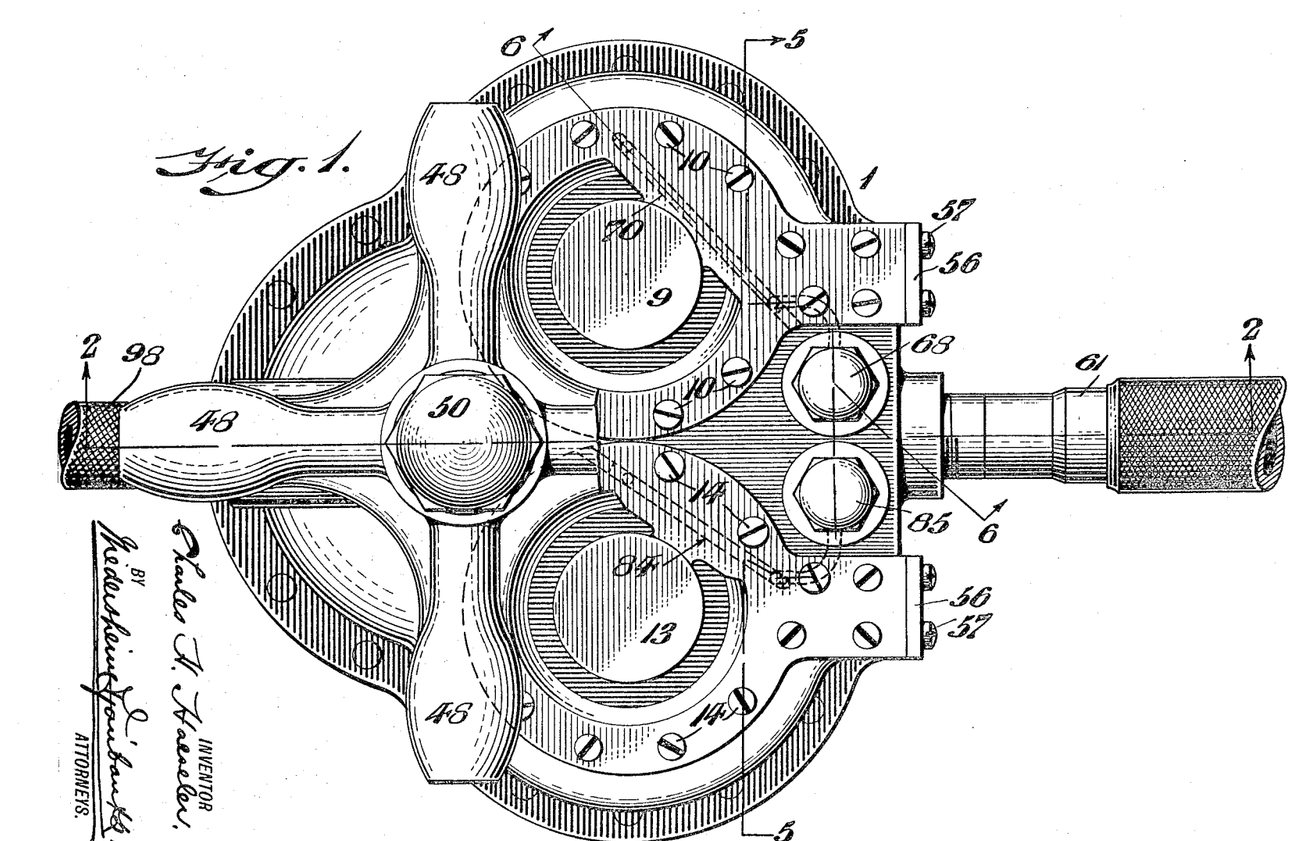
Figure 1 represents a top plan view of a rotary engine, embodying my invention.
Figures 1, 2:
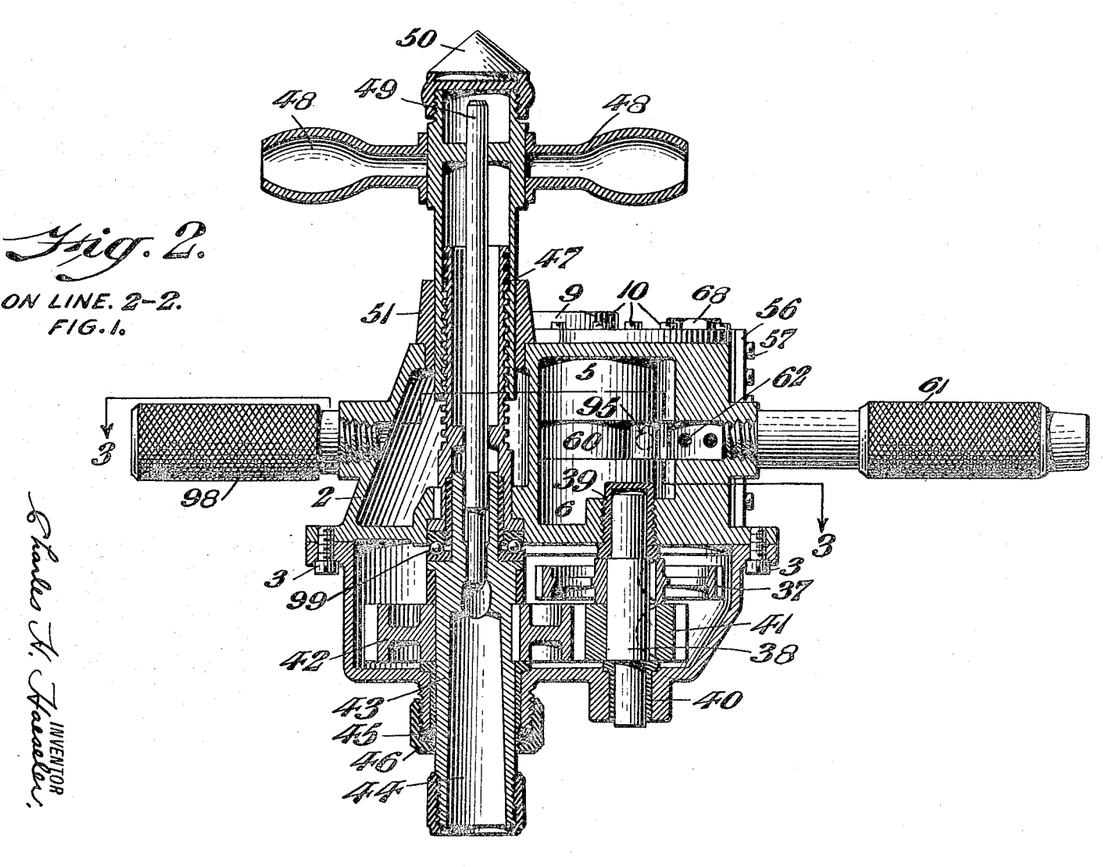
Figure 2 represents a section on line 2—2 of Figure 1.
Figures 2, 3:
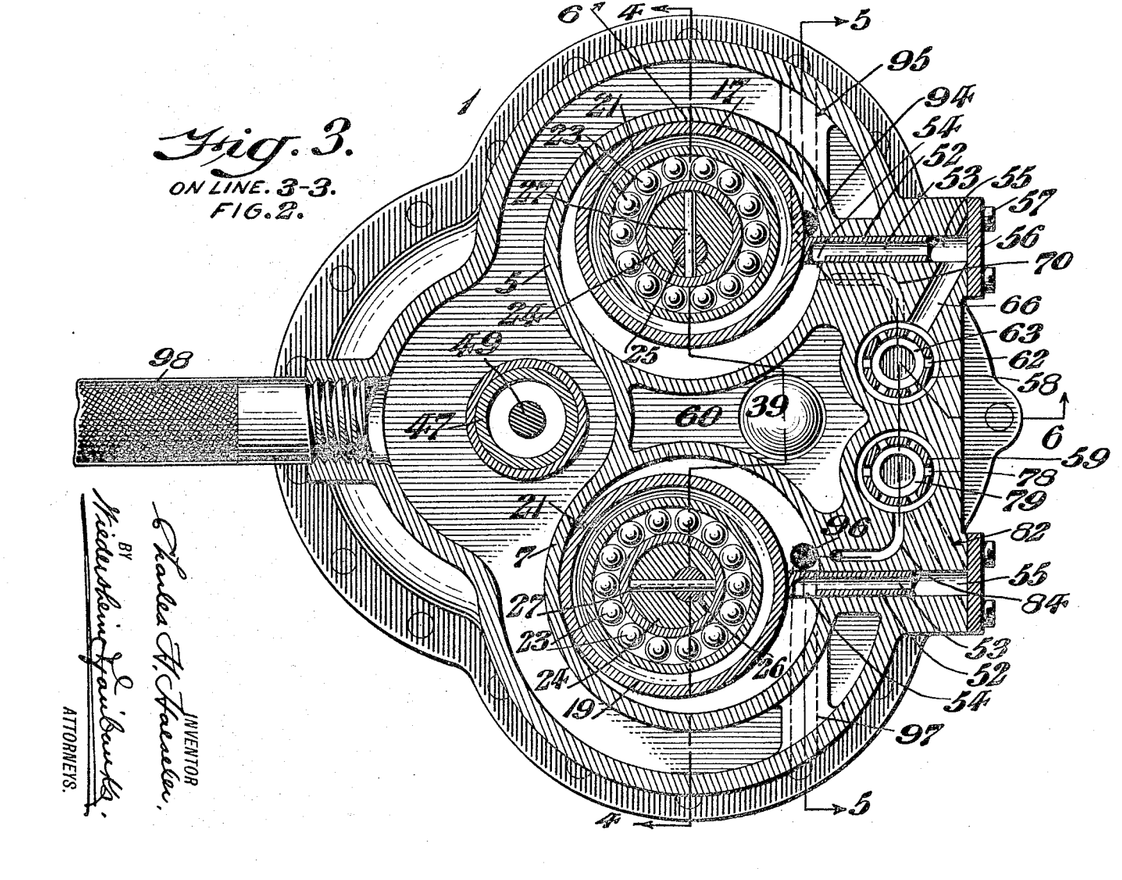
Figure 3 represents a section on line 3—3 of Figure 2.

The shaft 38 has also keyed to it a gear 41, which meshes with a gear 42 keyed to the drill spindle 43, which is provided with a socket 44, adapted to receive the shank of the drill or other type of working tool employed. The drill spindle 43 may be constructed in any desired manner, and, as illustrated in Figure 2, it is provided with a leather washer 45 secured in place by means of a gland nut 46 in order to prevent the lubricant passing from the gear case.

The drill spindle 43 has interposed between a portion of it and a threaded sleeve 47 a ball thrust bearing 99.

The sleeve 47 at its lower end is keyed to the body portion 2 and receives the sleeve of the feed screw 48, which latter may be of any desired or conventional type. The feed screw 48 is provided with a longitudinally extending rod 49, the forward end of which extends into the keyway of the socket 44, so as to serve as a tool extractor, when desired. The feed screw 48 carries in the usual manner a hardened steel center 50. The sleeve of the feed screw 48 is guided in a bearing 51, having a driving fit in the top wall of the body portion 2.

Each power cylinder has co-operating with it a sliding abutment 52, and since these abutments are each of the same construction and perform the same function, I have designated each of them by the same reference character. Each sliding abutment 52 consists of a rectangular shaped member having a passage 53 for the motive fluid, which opens through its rear end and extends through a port 54 in its side wall near its forward end. Each abutment is mounted in an aperture 55, cut through the body portion 2 and extending into its respective power cylinder. These apertures are closed by plates 56, secured in position by means of fastening devices 57.

*The valve mechanism.*

I employ automatically actuated independent valves to control the admission of motive fluid to each power cylinder. The body portion 2 is apertured to receive two valve sleeves 58 and 59, respectively, which have a driving fit in the body portion.

The valve sleeves 58 and 59 extend through a chamber 60 into which live motive fluid is admitted through the throttle valve handle 61 which is manually controlled and of any well known or conventional construction. The valve sleeve 58 is provided with ports 62 which are in free communication with the chamber 60 and with a chamber 63 within the valve sleeve. The valve sleeve 58 is provided with ports 64 which open into a chamber formed by an annular groove 65, and this groove communicates by means of a passage 66 with the chamber of the power cylinder 5, through the aperture 55 and the passage 53 in the sliding abutment 52.

The valve sleeve 58 has at each end a differential bore, and at its upper end it is provided with a differential valve 67 which in its forward or downward position closes the port 64, and in its raised or upward position the ports 64 are open or uncovered by the valve. The aperture in which the valve sleeve 58 is secured has, in threaded engagement with it, a valve sleeve cap 68 which is provided with an inwardly projecting portion 69 forming a stop to limit the outward movement or travel of the valve 67.

As will be understood from the foregoing, the inner or bottom face of the valve 67 is subjected to the pressure of live motive fluid at all times, and the outer or top face of the valve is subjected at certain times to the pressure of live motive fluid by means of a passage 70, formed partly in the body portion 2 and partly in the cylinder head, and communicating with the power cylinder bore at any desired point in its periphery so that the supply of live motive fluid to revolve a rotary piston can be cut off at any predetermined point during the revolution or stroke of the rotary piston.

Since I can only show one predetermined point at which such action takes place, I have preferred to illustrate it in such a manner that the supply of live motive fluid to each piston is cut off as soon as such piston performs three-quarters of its revolution or stroke. The valve sleeve 58 is also provided with ports 71, which communicate with a chamber formed by an annular groove 72, which is in communication by means of a passage 73 with the passage 55, which communicates with the power cylinder 6. The ports 71 are controlled by means of a differential valve 74, the outer face of which is intermittently subjected to live air pressure through the passage 75 which extends through the body portion 2 and the cylinder head 11 and opens into the power cylinder 6. The aperture, in which the valve seat 58 is fitted, is closed at its lower end by means of a valve sleeve cap 76 having an inward extension forming a stop 77, which limits the outward travel of the valve 74.

The valve sleeve 59 is provided with the ports 78 which communicate with the chamber 79 formed by its inner bore, and ports 80 are provided which communicate with a chamber formed by an annular groove 81, such chamber being in communication with power cylinder 7 by means of a passage 82. The upper end of the valve sleeve 59 has a differential bore to receive a differential valve 83, which controls the port 80. The outer or upper end of the valve 83 is intermittently subjected to live motive fluid entering through the passage 84 which communicates with the power cylinder 7. The upper end of the aperture, in which the valve seat 59 is seated, is closed by means of a valve sleeve cap 85, having an inward extension 86 serving as a stop to limit the outward movement of the differential valve 83. The valve sleeve 59 is also provided with ports 87 which communicate with a chamber formed by an annular groove 88, such chamber being in communication with the power cylinder 8 by means of the passage 89, which communicates with the passage 53 and the apertured abutment 52. The lower end of the valve case 59 has a differential portion in which is mounted a valve 90, the inner portion of which is always subjected to live motive fluid, while is outer face is intermittently subjected to live motive fluid which is conducted thereto by means of a passage 91 which opens into the power cylinder 8.

The lower end of the aperture in which the valve sleeve 59 is secured is closed by means of a valve sleeve cap 92 having an inwardly extending portion 93 which forms a stop to limit the outward movement of the valve 90.

An exhaust passage 94 communicates with the upper and lower power cylinders 5 and 6, respectively, and is in communication with a common exhaust passage 95 which passes laterally through the body portion 2. 96 designates an exhaust passage communicating with the power cylinders 7 and 8, respectively, and with a common exhaust passage 97 which extends laterally through the body portion and into communication with the atmosphere.

The body portion 2 has connected to it in any desired manner, ordinarily by a threaded connection, a dead handle 98 which is adapted to be grasped by the operator during the operation of the rotary drill.

The operation of my novel construction of rotary engine will now be readily apparent to those skilled in the art to which this invention appertains, and is as follows:—

Assuming that the parts are in the positions shown diagrammatically in Figures 7 and 8 and the throttle valve handle 62 has been actuated to permit the motive fluid to pass to the chamber 60, see more particularly Figure 5, the operation is as follows:—

Figure 5:
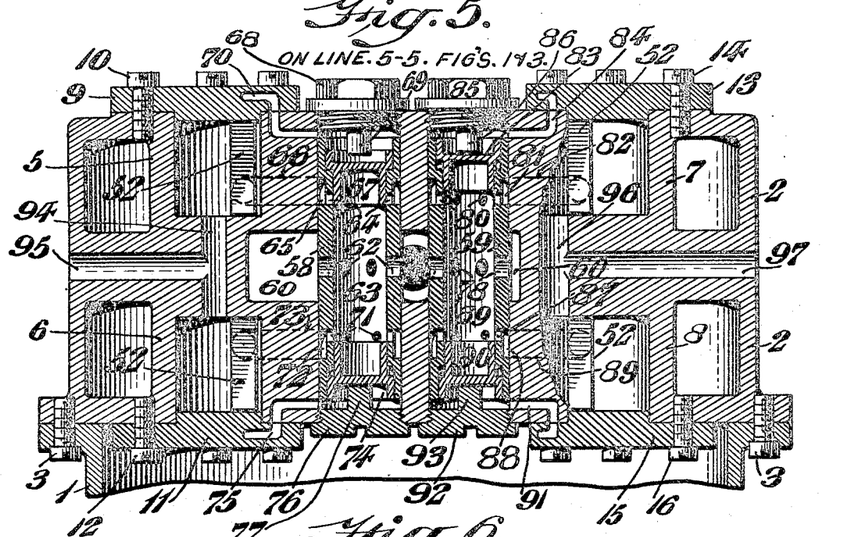
Figure 5 represents a section on line 5—5 of Figures 1 and 3.
Figure 6:
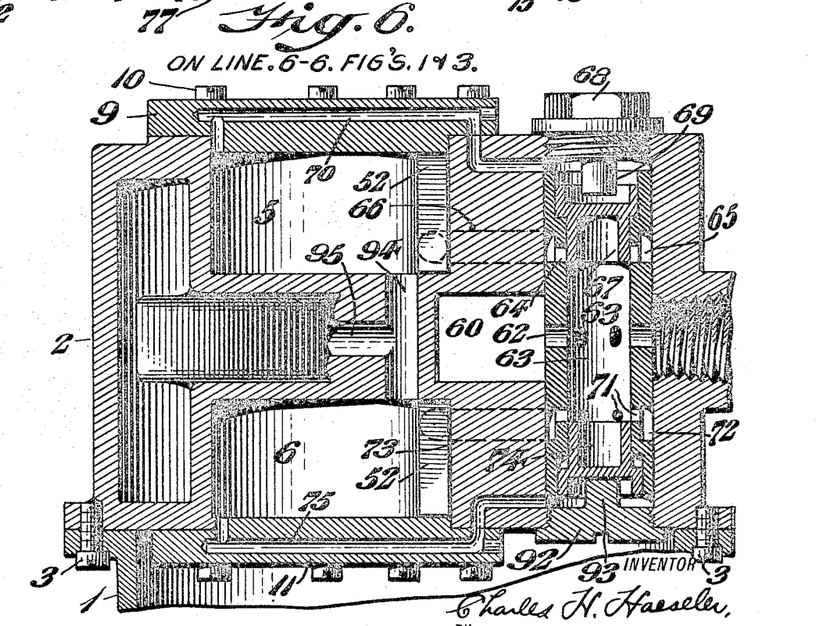
Figure 6 represents a section on line 6—6 of Figures 1 and 3.

The motive fluid in the chamber 60 is free to pass through the port 62 into the valve chamber 63 of the valve seat 58, and, at this time, it is free to pass into the upper lefthand engine through the ports 64, passage 66 and through the sliding abutment 52, see Figure 5. It also passes freely through the ports 78 into the valve chamber 79 and through ports 80, passage 82, and sliding abutment 52 into the chamber of the power cylinder 7. It also passes through the ports 87 in the valve sleeve 59, passage 89, sliding abutment 52, into the power cylinder 8.

Figure 7:
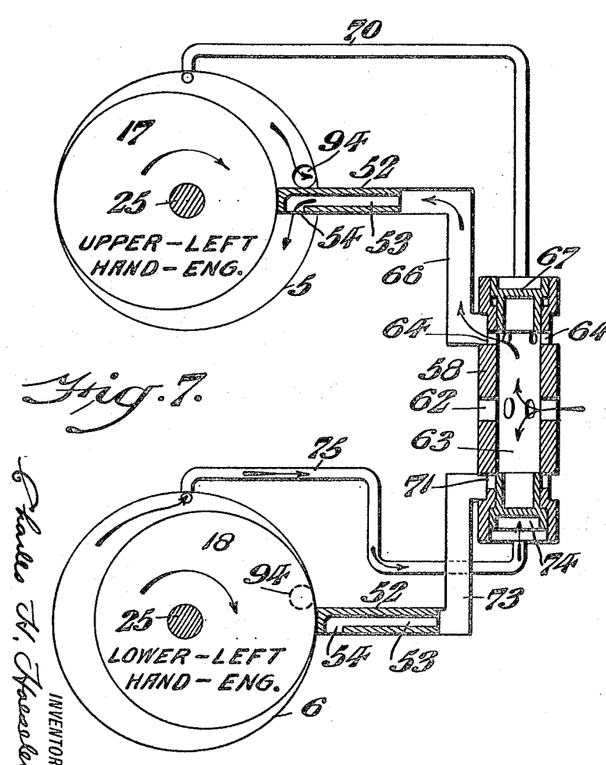
Figure 8:
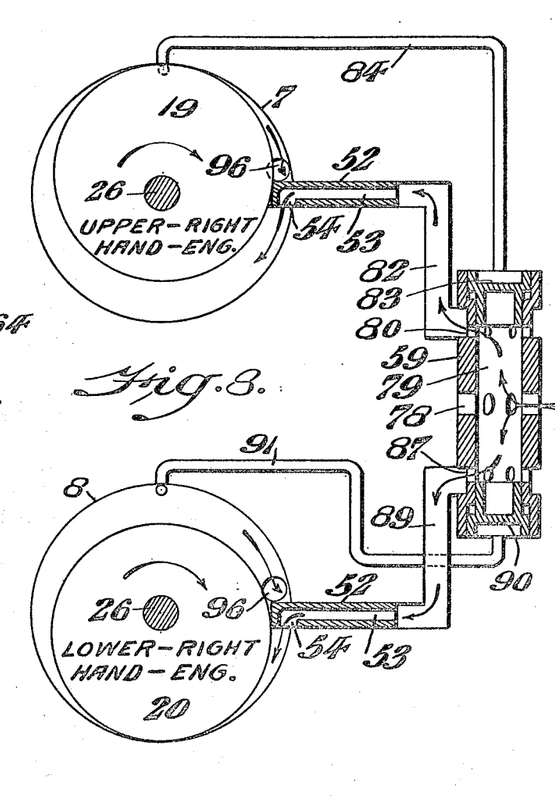

At this time, the motive fluid in advance of the rotary piston is free to exhaust through the exhaust ports 94 in the power cylinders 5 and the exhaust ports 96 in the power cylinders, 7 and 8, see Figures 7 and 8, but cannot exhaust through the exhaust port 94 of the power cylinder 6. The motive fluid in the power cylinder 6 passing through the passage 75 and impinging against the outer face of the differential valve, 74 retains this valve 74 in the position seen in Figure 7, due to the differential pressure areas of the valve, which, at this time, is being acted upon in both directions by live motive fluid, but there is a preponderance of pressure tending to seat the valve 74 and cause it to close the ports 71, since the live motive fluid is now acting against the larger differential pressure area of the valve.

Figure 9:
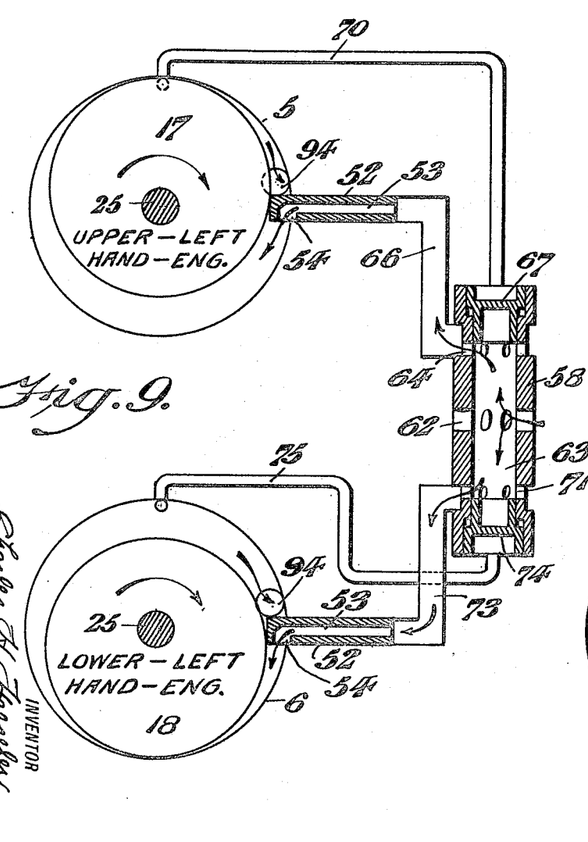
Figure 10:
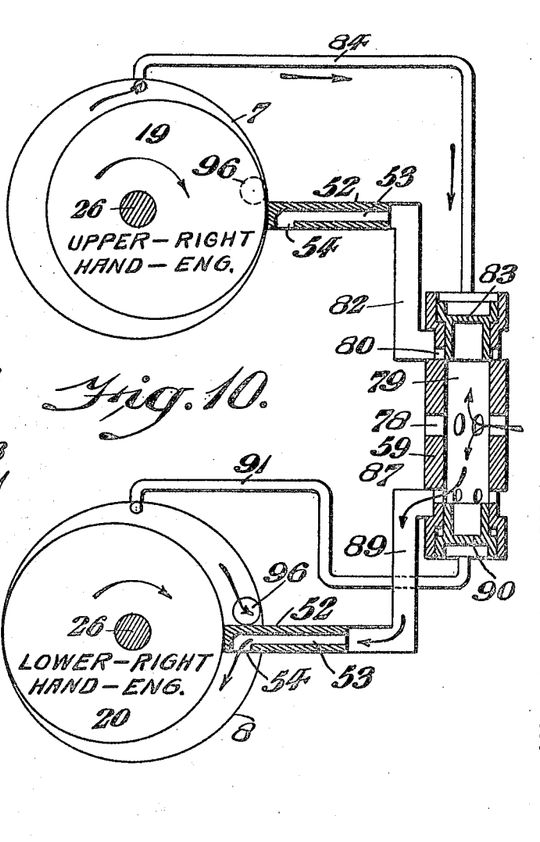

Assuming now that all of the rotary pistons have had imparted to them a quarter of a revolution from the position seen in Figures 7 and 8, the parts assume the position seen in Figures 9 and 10. At this time, live motive fluid is entering the power cylinders 5 and 6, see Figure 9, and the power cylinder 8, see Figure 10, and it is cut off from entering the power cylinder 7 since the piston 19 has moved the sliding abutment 52 outwardly thereby cutting off its ports 54 through which motive fluid is admitted to such power cylinder.

The live motive fluid now passes from the valve chamber 63, see Figure 9, through the ports 64 and passage 66 and through the sliding abutment 52 into the power cylinder 5. It also passes from the valve chamber 63 through the ports 71 and passage 73, and sliding abutment 52, into the power cylinder 6. The live motive fluid is cut off from the power cylinder 7, but passes into the power cylinder 8 through ports 87, passage 89 and sliding abutment 52. At this time the exhaust is taking place through the exhaust ports 94 from the power cylinders 5 and 6 and exhaust port 96 from power cylinder 8.

Figure 11:
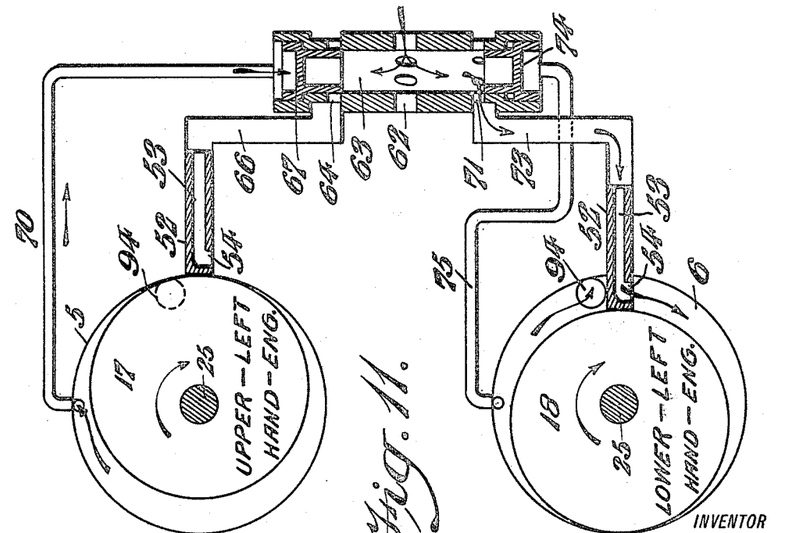
Figure 12:
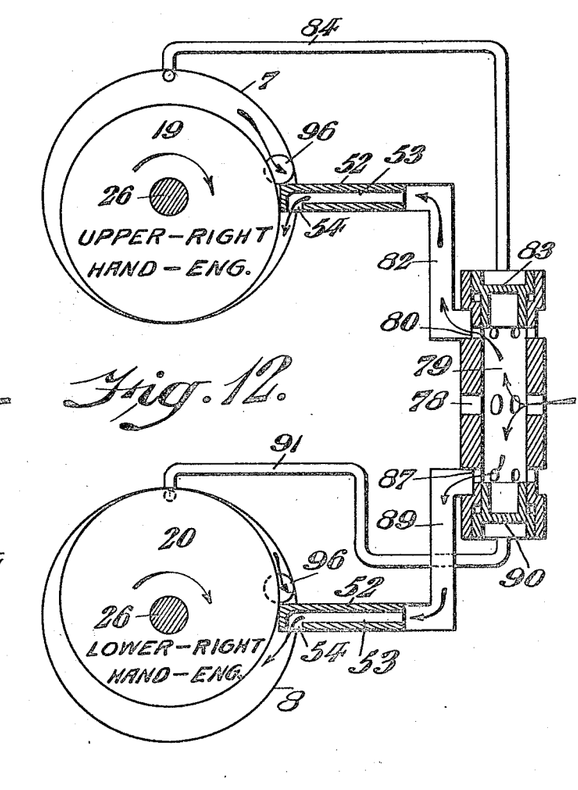

Referring next to Figures 11 and 12, the parts are shown in the position which they assume when another quarter of a revolution has been imparted to them, or, in other words, a half revolution from the position seen in Figures 7 and 8.

In this position live motive fluid is entering the power cylinders 6, 7 and 8 and is exhausting from the power cylinders 6, 7 and 8. The live motive fluid passing from the power cylinder 5, see Figure 11, through passage 70 has moved the valve 67 into a position to close the ports 64. The live motive fluid is passing into the power cylinder 6 through the port 71, passage 73 and sliding abutment 52. The motive fluid is passing into the power cylinder 7 through ports 80, passage 82 and sliding abutment 52. The motive fluid is passing into the power cylinder 8 through the ports 87, passage 89 and sliding abutment 52. The exhaust is taking place from the power cylinder 6 through the exhaust port 94 and from the power cylinders 7 and 8 through exhaust ports 96.

Figure 14:
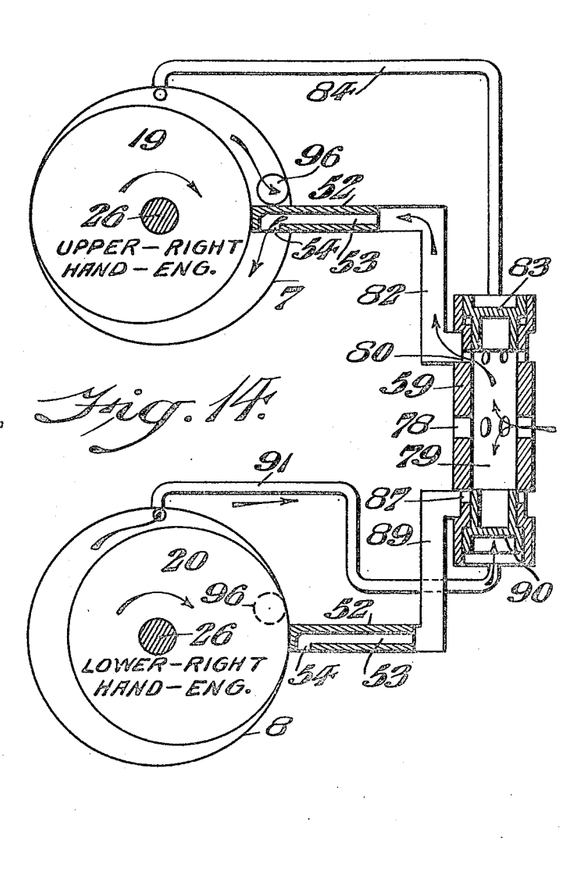
Figure 15:
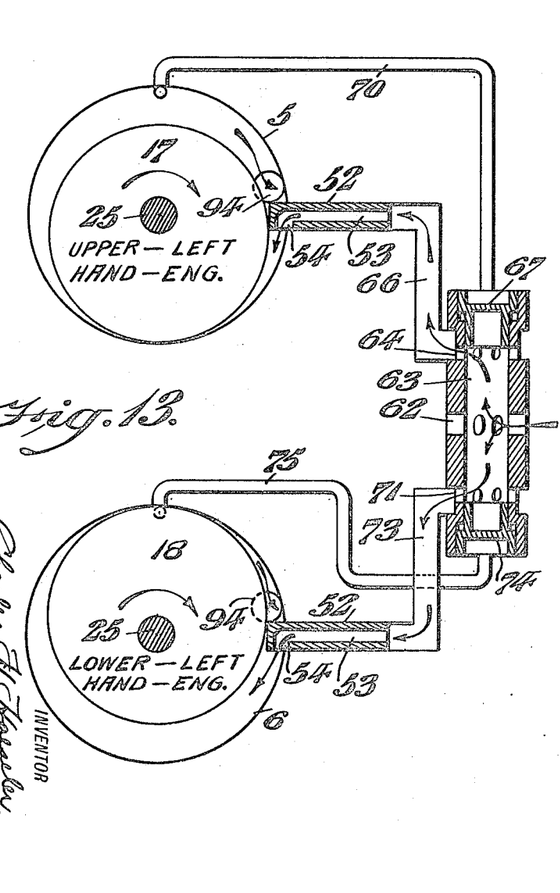

Referring now to Figures 13 and 14, the parts are shown in the position which they assume when another quarter revolution has been imparted to the rotary piston. At this time live motive fluid is passing into the power cylinders 5, 6 and 7 and is cut off from the power cylinder 8, since the piston 20 has moved into a position to move the abutment 52 outwardly and close its ports 54. The live motive fluid is passing into the power cylinder 5, through port 64, passage 66 and sliding abutment 52. Motive fluid is now passing into power cylinder 6 through the port 71, passage 73 and sliding abutment 52. The motive fluid is passing into the power cylinder 7 through the ports 80, passage 82 and sliding abutment 52. The exhaust is taking place from the power cylinders 5 and 6 through the exhaust port 94 and from the power cylinder 7 through exhaust port 96.

It will be understood from the foregoing description that, as illustrated, when a rotary piston has revolved three quarters of its revolution or stroke, the live motive fluid present in such power cylinder is free to pass to the automatic valve controlling the admission of motive fluid to such power cylinder since the rotary piston uncovers the port communicating with a passage such as 70, 75, 84 and 91 leading to the outer face or larger differential pressure area of its respective valve.

It will thus be seen that the outer face or greater differential pressure area of each valve 67, 74, 83 and 90 is intermittently subjected to a preponderance of live motive fluid in order to move them into their closing position. These valves are at all times subjected to the pressure of live motive fluid acting against their smaller differential pressure area which tends to move them outwardly or into their open position.

It will now be understood that in accordance with my present invention, I employ a plurality of sets of rotary engines, with the pistons of each set superimposed and in conjunction with such construction, I employ an automatic valve controlling the admission of motive fluid to its respective engine cylinder, and I provide means for enabling the automatic closure of any of such valves when a predetermined portion of the stroke of any piston has been completed.

The shafts of the different rotary pistons are in geared connection with the driving spindle so that rotation of the working tool is effected.

It will be understood by those skilled in this art that, in accordance with my present invention, at least three of the pistons at any quarter revolution have the pressure of live motive fluid acting against them to create a substantially uniform pulling torque on the drill spindle and the live motive fluid at this time is cut off from one of the rotary pistons.

It will be evident that the sliding abutments 52 are maintained in contact with their respective rotary pistons by the pressure of the live motive fluid, and they are moved inwardly by their respective piston against the pressure of the live motive fluid to effect the closure of their port 54 as each eccentrically mounted piston comes into proper position during its rotation.

It will now be apparent that I have devised a novel and useful construction of a rotary engine which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, and fluid actuated means automatically controlled by said pistons to progressively admit motive fluid into said piston chambers to drive their respective pistons.

2. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, and fluid actuated means automatically controlled by said pistons to progressively admit motive fluid into said piston chambers to drive their their respective pistons and to cause a plurality of said pistons to be always operative to actuate said driven member.

3. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, and fluid actuated means automatically controlled by said pistons to progressively admit motive fluid into said piston chambers to drive their respective pistons and to cause three of said pistons to be always operative to actuate said driven member.

4. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, and fluid actuated means automatically controlled by said pistons to progressively admit motive fluid into said piston chambers to drive their respective pistons, said pistons automatically controlling the exhaust from their piston chambers.

5. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, a valve for each piston controlling admission of motive fluid to actuate it, means to furnish a constant supply of motive fluid tending to move each of said valves in one direction, and means controlled by the pistons to effect the movement of their respective valves in an opposite direction.

6. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, an independent valve for each piston controlling the admission of motive fluid to actuate it, each of said valves being subjected on one side to a constant supply of motive fluid to move it in one direction and intermittently subjected on its opposite side to motive fluid to move it in the opposite direction.

7. A rotary engine adapted to be manually supported, comprising a piston casing having on opposite sides of its vertical axis sets of piston chambers, each set having superimposed piston chambers, a rotary piston in each piston chamber, shafts common to the pistons of a set and disposed in parallelism with said vertical axis, a driven member intergeared with said shafts, a valve for each piston controlling admission of motive fluid to actuate it, means to furnish a constant supply of motive fluid tending to move each of said valves in one direction, and means controlled by the pistons to effect the movement of their respective valves in an opposite direction, said pistons automatically controlling the exhaust from their piston chambers and also the exhaust from one end of their respective controlling valve.

CHARLES H. HAESELER.

Witnesses:
H. S. FAIRBANKS,
C. D. McVAY.